United States Patent [19]
Dolph

[11] Patent Number: 5,388,039
[45] Date of Patent: Feb. 7, 1995

[54] METHOD OF AND APPARATUS FOR ACTIVATING FISH ATTRACTORS HAVING A LUMINESCENT SURFACE WHICH IS LIGHT ACTIVATABLE

[75] Inventor: James L. Dolph, Port Hope, Mich.
[73] Assignee: GloTube, Inc., Port Hope, Mich.
[21] Appl. No.: 157,966
[22] Filed: Nov. 24, 1993
[51] Int. Cl.6 .............................................. F21V 33/00
[52] U.S. Cl. ............................... 362/154; 250/504 H; 250/459.1; 250/462.1; 362/84; 43/17.6
[58] Field of Search ............ 250/504 H, 504 R, 462.1, 250/459.1; 43/17.6; 362/154, 84

[56] References Cited

U.S. PATENT DOCUMENTS

| | | | |
|---|---|---|---|
| 1,817,694 | 8/1931 | Lafky | 43/17.6 |
| 1,900,339 | 3/1933 | Harrell | 43/17.6 |
| 2,303,097 | 11/1942 | Townsend et al. | 43/17.6 |
| 5,311,413 | 5/1994 | Farmer et al. | 362/154 |

OTHER PUBLICATIONS

Article #9490 Power Flash, Flash Charger For Glo Lures from Luhr-Jensen catalog.

*Primary Examiner*—Jack I. Berman
*Attorney, Agent, or Firm*—Learman & McCulloch

[57] ABSTRACT

A method of and device for activating a luminescent fish attractor which is light activatable with a flash element connected with a battery housed in a battery casing via a voltage building circuit to provide highly intensive light flashes. The casing is provided with a tubular enclosure having a first end receiving light flashes from a flash element, and a second remote open end. The enclosure has an interiorly facing, substantially opaque, light reflective surface for concentrating light rays emitted from the flash element. The lure or attractor is first placed in the enclosure by inserting it through the remote open end. The flash element is then repetitively powered, and the flashed light rays emitted are directed successively into the enclosure. The light rays are repetitively bounced from one reflective surface portion to another along the light reflective surface to impinge upon all luminescent surfaces of the attractor to thereby cause them to later emit light in low light conditions for a protracted period of time, after which the lure or attractor is removed from the enclosure.

20 Claims, 5 Drawing Sheets

METHOD OF AND APPARATUS FOR ACTIVATING FISH ATTRACTORS HAVING A LUMINESCENT SURFACE WHICH IS LIGHT ACTIVATABLE

BACKGROUND OF THE INVENTION

1. Field of the Invention

This invention relates to methods for exciting fishing line attached lures and other fish attractors having luminescent properties. More particularly, the invention relates to a self-contained, portable device for saturating a phosphorescent attractor in a much more rapid manner which provides maximum luminance for a long period of time.

2. Description of the Prior Art

Sports fishermen today, and particularly those who fish at night or in low light conditions, use fishing lures and other attractors which fully, or partly, are coated or provided with a phosphorescent or photoluminous material which must be activated or excited after short periods of use by exposing them to an external light source. In some cases, the photoluminous energy storing material is incorporated in another material such as a plastic, prior to the time the attractor is molded or otherwise fashioned. Attractors which are activated to glow in the dark have been marketed for a long time and are, for example, illustrated in the Lafky U.S. Pat. No. 1,817,694, the Herrell U.S. Pat. No. 1,900,339, and the Townsend U.S. Pat. No. 2,303,097. Fishermen, today, use incandescent light sources such as flashlights, vehicle headlights or spot lights, and coleman-type lanterns for reactivating the photoluminous material, but "charging" the photoluminous material with such light sources has required an undue period of time, and the photoluminous material has not produced the required luminosity which many fishermen desire and find useful. Other fishermen have used the flashbulbs on their personal cameras but, aside from risking their cameras in so doing, because cameras are not normally leak proof nor suited to harsh environments, the light which spreads out from the flashbulb, and is not concentrated, often does not provide as long an activation as the user would like, and it takes many flashes to achieve excitation. Obviously, battery degradation is a problem in the use of the battery activated units mentioned, which require a long period of time to achieve the excitation which they provide. More recently, a device which simply is a flashbulb affixed to a battery casing has been marketed as a lure charger, but this device operates in the same manner as a camera flashbulb and provides only the same results. Other strobe type units to be found in the marketplace are the strobe lights used for signaling, for example, and, while these can be used in the same manner as the camera, they are not well suited to exciting fishing lures.

SUMMARY OF THE INVENTION

The method and apparatus of the present invention provides an attractor receiving enclosure which extends from a battery casing, and a high intensity, flash element which directs its light into one end of the enclosure. The lure or other attractor is inserted through the opposite remote open end of the enclosure, which completely envelops it and concentrates light rays emitted from the flash element to saturate the photoluminescent surfaces of the attractor quickly by repetitively bouncing the light rays from one highly reflective surface portion of the enclosure interior to another.

One of the prime objects of the present invention is to provide a high intensity, battery powered exciting light source with an elongate exciter enclosure designed to both accommodate an attractor and subject it to concentrated light rays which are prevented from spreading into the surrounding atmosphere until they have performed a luminescence exciting function.

Another object of the invention is to provide an exciter which may require as little as three flashes to activate the phosphorescent material in a manner which provides a maximum duration luminescence, once the lure or attractor is removed from the enclosure and subjected to low light conditions.

Still another object of the invention is to provide an exciter enclosure designed to cause light rays, emitted from a strobe such as a xenon tube and reflectively directed into an enclosure, to repetitively bounce from one highly reflective surface portion to another along the light reflective surface of the enclosure and impinge evenly from 360° upon substantially all surfaces of the lure or attractor regardless of the configuration of the lure, to thereby cause all the luminescent surfaces of the attractor to store electromagnetic energy and emit light in the dark for protracted periods of time.

A further object of the invention is to provide a device which is specifically designed to be water, rust, and shock resistant within limits, and to provide longer periods of glow which permits the lures or other attractors to be fished instead of recharged.

Another object of the invention is to provide a device which can be used very easily to provide longer and more intense phosphorescent light emitting effects, which is easy to operate, and which accomplishes its task quickly and consistently.

Still another object of the invention is to provide a relatively lightweight, hand held device designed to withstand harsh environments.

Another object of the invention is to provide a device having an exciter enclosure of the character described with a target ring which serves to assist the fisherman to move the lure or other attractor safely into the open end of the enclosure in a most expeditious manner.

Still another object of the invention is to provide a device of the character described having a target which is phosphorescent in character and acts as a timing device for the fisherman to determine when the lure needs reactivating.

Still another object of the invention is to provide a device which can be readily and easily manufactured, and which is of a simple nature, which permits it to be economically produced and marketed.

Still a further object of the invention is to provide a device of the type described which is durable and efficient, and reliable in operation, so that its battery need not be continually changed or recharged.

Other objects and advantages of the invention will become apparent with reference to the accompanying drawings and the accompanying descriptive matter.

GENERAL DESCRIPTION

Figure 1:
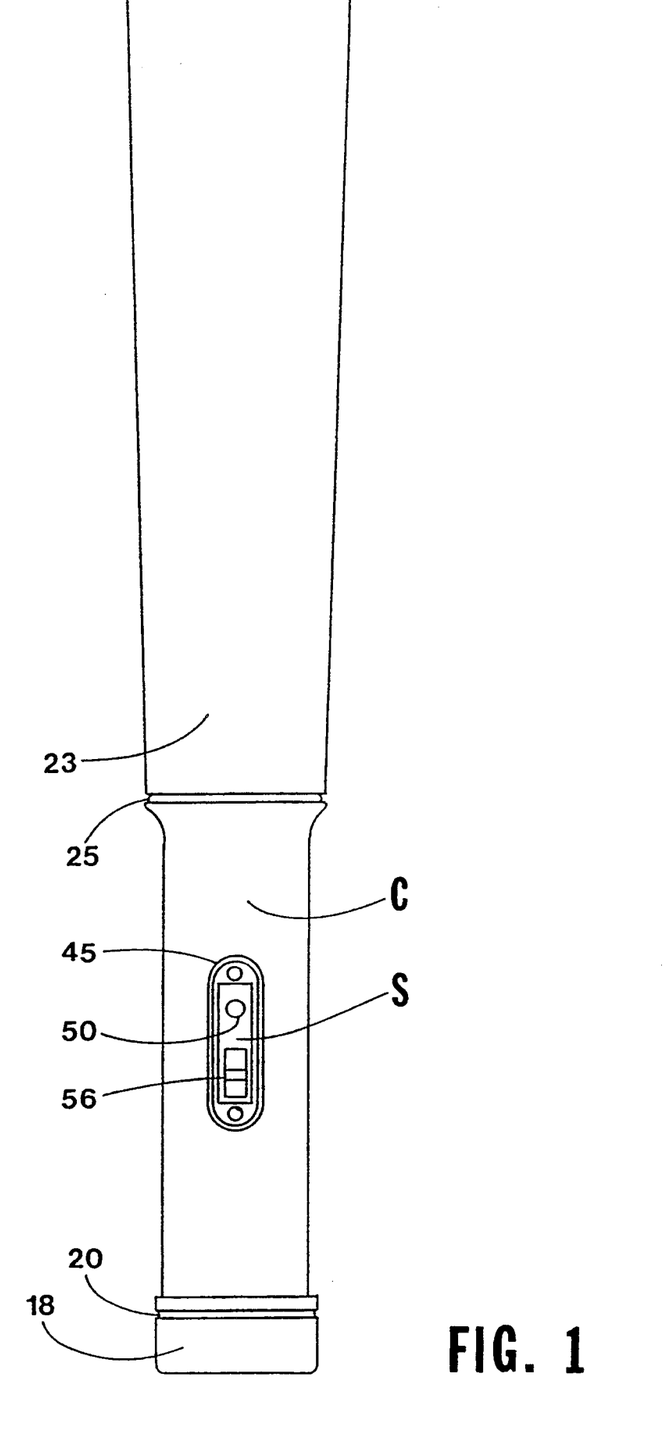
FIG. 1 is a top plan view illustrating my exciter device.
Figures 2, 2A:
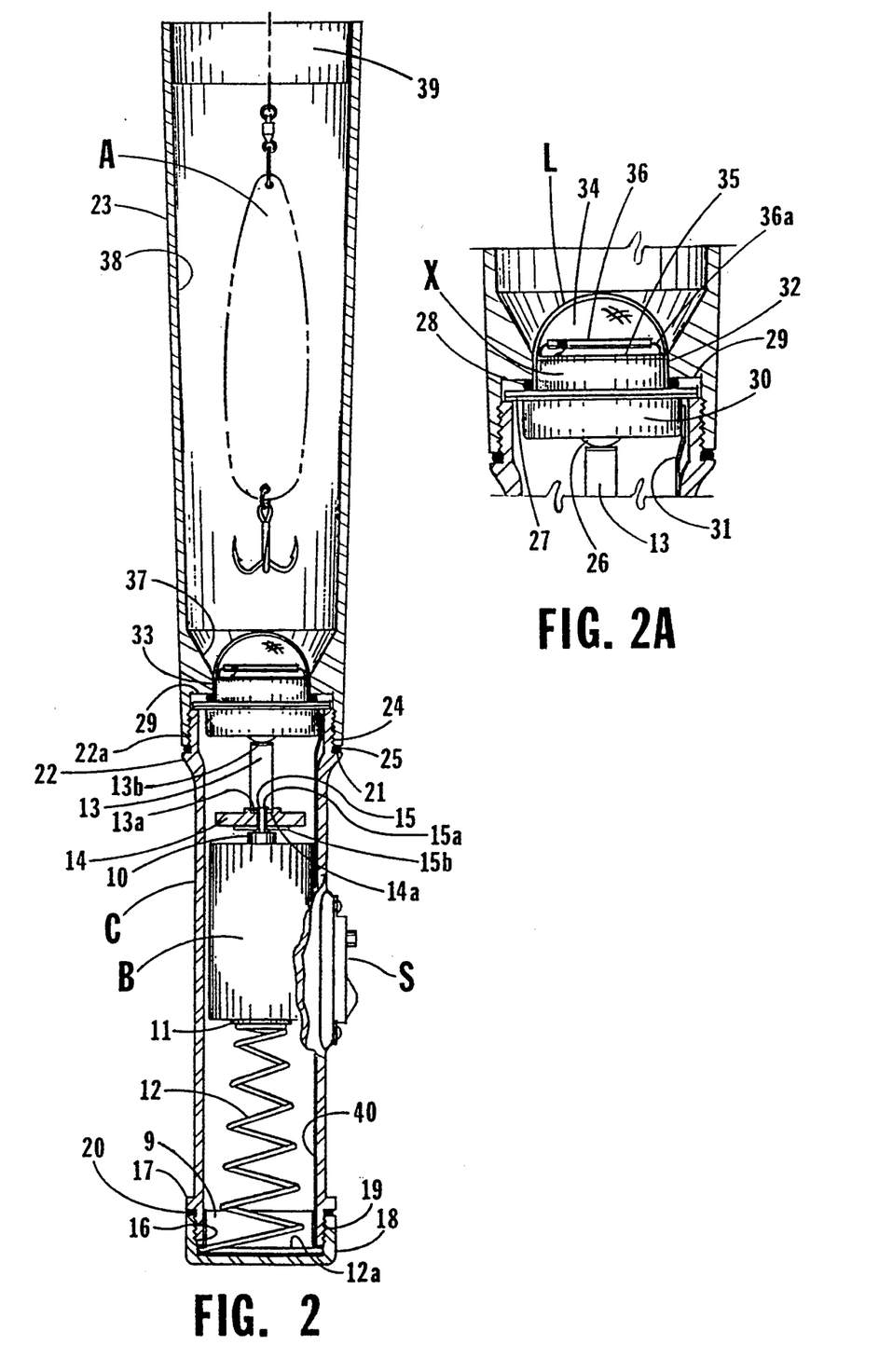
FIG. 2 is a sectional, schematic elevational view showing a still attached lure received within the light-concentrating enclosure.
FIG. 2A is a greatly enlarged, side elevational view of a portion of the device illustrated in FIG. 2.
Figure 3:
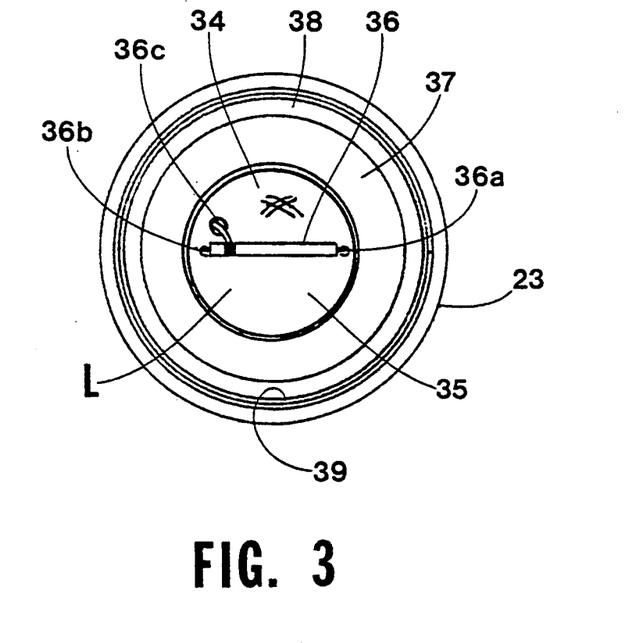
FIG. 3 is an end elevational view taken from the open end of the device illustrated in FIG. 1.

Referring now more particularly to the accompanying drawings, and in the first instance to FIGS. 1 and 2 thereof, the device of the invention typically includes an electrically nonconductive battery casing generally designated C which may be of cylindrical configuration to receive a cylindrical battery, generally designated B, for powering the unit. An inexpensive 1.5 volt, direct current alkaline D size battery may be used. As usual, the battery B includes a positive terminal 10 and a negative terminal 11, and a coil spring 12 may be housed within the casing C to bias the battery upwardly in FIG. 2 forwardly toward an electrically conductive leaf contact 13. The leaf spring contact arm 13 has a flange 13a secured within the recess 14a provided in a crosspiece 14 which spans the interior of casing C and is fixed to the interior wall thereof. An electrically conductive rivet 15 has flanges 15a and 15b to secure the contact 13 in place, and it is flange 15b which is in electrical contact with the positive terminal 10 of the battery B.

At its rear end, casing C is externally threaded as at 16 and flanged as at 17 to receive a removable end cap 18 which is internally threaded as at 19 and is separated from flange 17 by the sealing O-ring 20. O-ring 20 is a conventional rubber or elastomer ring which is utilized to provide a water tight connection for cap 18. It will be noted that the endmost convolution 12a of the spring 12 is of enlarged diameter to fit within the cap in contact with a bus ring 9 fixed to the casing wall.

At its front end, casing C is flanged as at 22 and externally threaded as at 22a to receive an enclosure tube generally designated 23 which is internally threaded at its rear end as at 24 as shown to thread on the front end of casing C. A rubber or elastomer sealing O-ring 25 is similarly employed between the flange 21 and the rear end of enclosure tube 23 to seal off the front end of casing C.

It will be observed that front end of conductive spring arm 13 is flanged as at 13b to contact one of the terminals 26 of a xenon tube flashtube module, generally designated X, which, like the battery B, is commercially available. The module X is flanged as at 27 so as to be received by the front end wall of casing C and it will be noted that a sealing rubber or elastomer O-ring 28 may be used between the module flange 27 and an internal shoulder 29 provided interiorly in the front end of enclosure tube 23. It is the electrically conductive cylindrical wall 30 of the module X which is separated by a nonconductive insulator (not shown) from the terminal 26, and which is engaged by the leaf spring contact strip 31 which extends axially into engagement with the wall surface 30 to enable completion of the circuit to the module X in a manner which will presently be more particularly described. A synthetic plastic cover or lens L for module X has a cylindrical wall 32 which fits within the bore wall 33 provided in the enclosure tube 23 adjacent to shoulder 29, and it is to be noted that the wall 32 is separated from the transparent dome portion 34 of lens L by a flat reflective plate 35. Plate 35 preferably is a chrome plated plastic plate having a highly reflective mirror finish. Fixed within the dome 34, is the xenon flashtube 36 which has the usual wires or leads 36a extending from its ends. A high voltage tube electrode and lead is shown at 36b.

Provided within enclosure tube 23 to extend internally forwardly from the wall 33 is a divergent wall 37 leading to the more shallowly frustroconical internal surface 38 of an elongate nature which extends forwardly to house and enclose the typical lure attractor generally designated A, as shown in FIG. 2.

Figure 6:
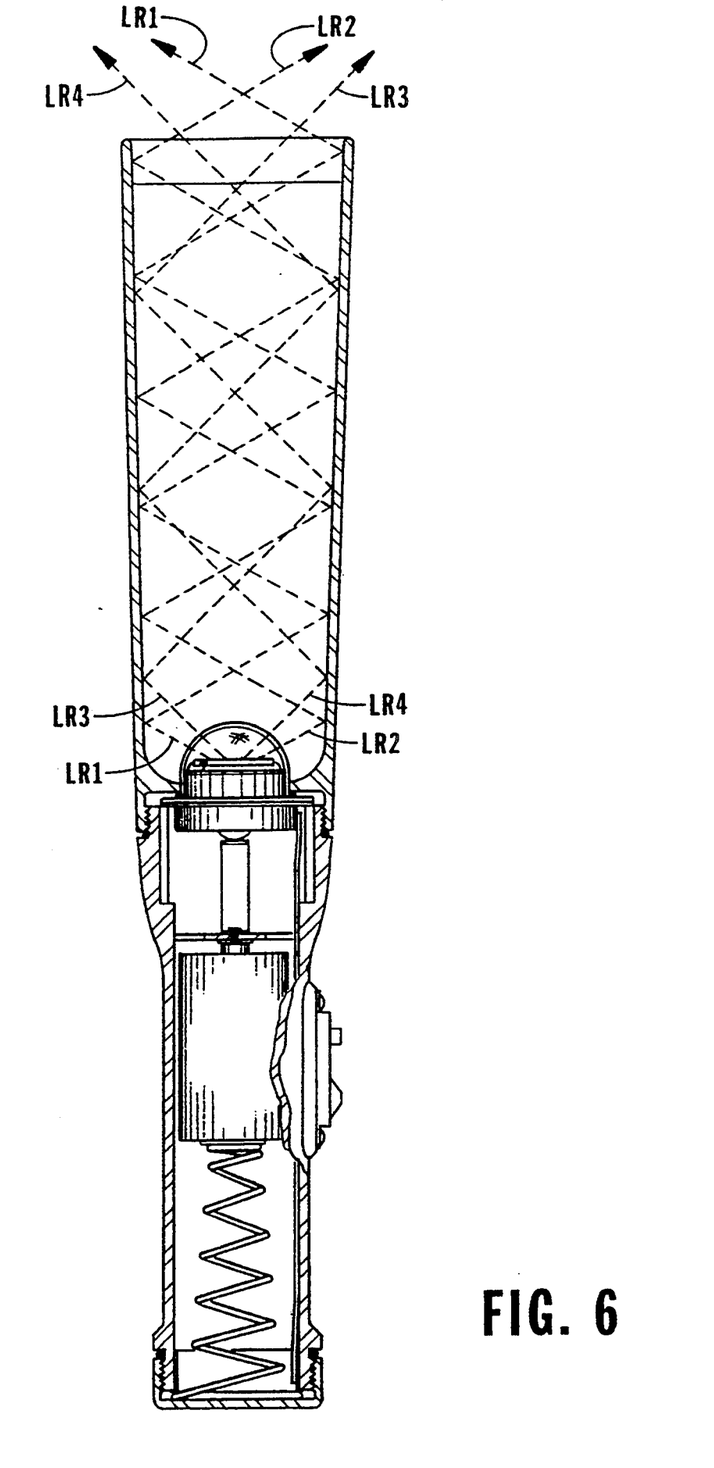
FIG. 6 is an enlarged schematic fragmentary, sectional elevational view illustrating the manner in which light rays bounce repetitively along a slightly modified exciter enclosure.

It is to be observed that the enclosure tube 23 is preferably a frustroconical member which may be formed of a suitable plastic or metal which is specially treated or adapted, to provide highly reflective, opaque surfaces 37 and 38 for receiving and reflecting light rays which move in a zigzag radially concentrated path of travel from the module X forwardly in enclosure 23 along surfaces 37 and 38 as shown in FIG. 6. If formed of metal, enclosure 23 will have its internal surface machined, plated, or metalized to provide a highly reflective glossy surface within the range of 4 to 125 microns and preferably in the neighborhood of 70 microns. When the enclosure tube 23 is molded of a suitable plastic, the interior surfaces 37 and 38 can be chrome plated to provide the same micron finish or, if the tube 23 is of a translucent plastic material the exterior wall of the tube enclosure 23 may be metal plated or metalized in such a manner that an opaque glossy side is interiorly facing, and provides the reflective surface interiorly.

At the remote outer or front end of the tubular enclosure 23, a photoluminescent ring or band 39, which can be in the form of an adhesive tape, or which can be painted on or furnished in any other suitable manner, provides a target ring which will be visible at night to facilitate the use of the device.

Figure 4:
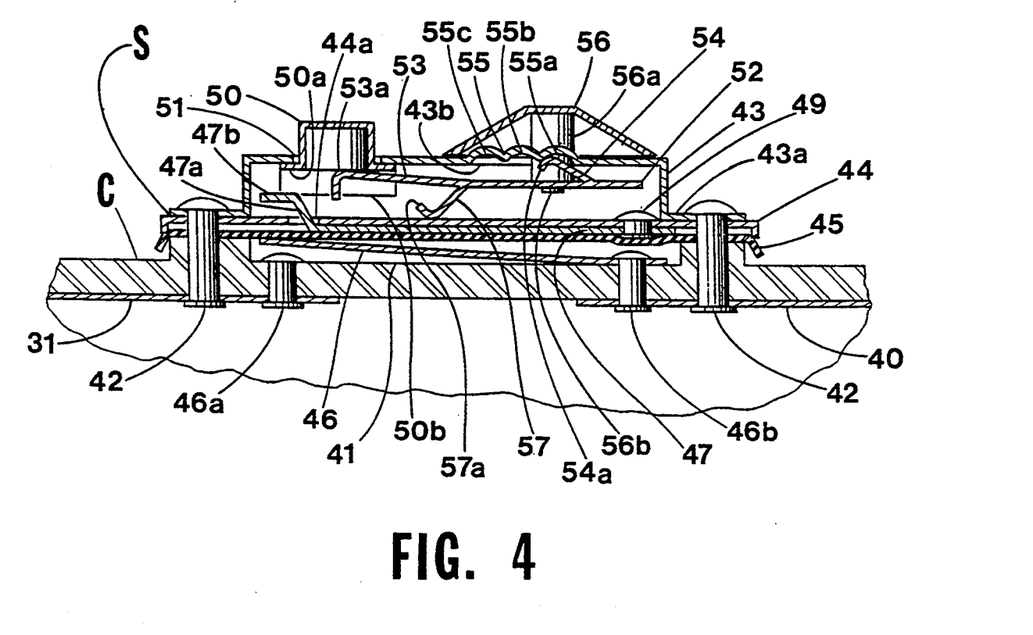
FIG. 4 is a greatly enlarged, side elevational view illustrating a typical switch device which may be used to activate the flash circuit.

The contact strip 31 which is fixed to the interior of nonconductive casing C may be selectively connected with an aligned electrically conductive bus strip 40 by a conventional switch mechanism, generally designated S, which is particularly illustrated in FIG. 4. The strip 40 can extend under bus ring 9 in electrical contact therewith and with the conductive spring 12. The switch assembly S for selectively electrically connecting the conductive strips 31 and 40 is more particularly disclosed in FIGS. 2 and 4 from which it will be noted that the switch assembly is secured over a recess 41 provided in the wall of the nonconductive casing C and the switch assembly may be secured in position by nonconductive rivet members 42. The assembly includes a housing 43 which is flanged as at 43a to seat upon a rigid plate member 44 which spans and substantially seals off the recess 41 by way of a flexible, nonconductive, sealing gasket member 45. Provided under the member 45 within recess 41, is a contact arm 46 secured at only one end by an electrically conductive rivet 46b which also secures the one end of contact strip 40 in position.

In the inoperative position of switch mechanism S, the opposite front end of contact strip 46 is located a slightly spaced distance above an electrically conductive rivet 46a which secures the rear end of strip 31 in position. Provided above the member 45 and secured to the plate 44 by a nonconductive rivet 49, is a resilient metal leaf spring 47 having an angularly extending, upstanding wall part 47a thereon. The upper end of the portion 47a is horizontally flanged as at 47b for a purpose which will be more particularly described. The wall 47a extends through an opening 44a in plate 44 up into housing 43 so that flange 47b is in the vertical path of a depressible button 50 which extends down through an opening 51 provided in the upper wall of housing 43. Button 50 is horizontally flanged at 50a, and vertically flanged as at 50b, the flange 50b functioning as a stop to limit the degree of button depression. The end 47a is also in the horizontal path of an actuating spring, generally designated 52, which includes a support arm 53 with a downturned end 53a below depressible button 50 and normally spaced from the actuator wall part 47a. At its rear end, member 52 has an upstanding keeper arm 54 with a concavely configured spring end 54a which extends up to engage a ribbed wall portion 55 on the upper wall of housing 43. A slide button 56 has a dependent post 56a, projecting through an elongate opening 43b in the housing 43 at the side of ribbed wall portion 55 to be connected by fastener 56b to button 56. The wall portion 55 provides a trio of longitudinally spaced detents 55a, 55b and 55c. The actuator 52 further includes a base portion 57 having a curvilinear end 57a which rides along the plate 44 when the actuator 52 is shifted longitudinally by slide button 56 and end 57a moves from detent 55a to detent 55b, and on to detent 55c.

As will appear subsequently when the operation of the switch S is described in detail, the contacts 31 and 40 can be momentarily bridged electrically by depressing button 50 and releasing it immediately, or engaged until released by pushing slide button 52 forwardly to detent 55c. It is to be understood that the switch assembly S is a commercially available switch assembly and that many forms of switches would be useful with the present device.

Figure 5:
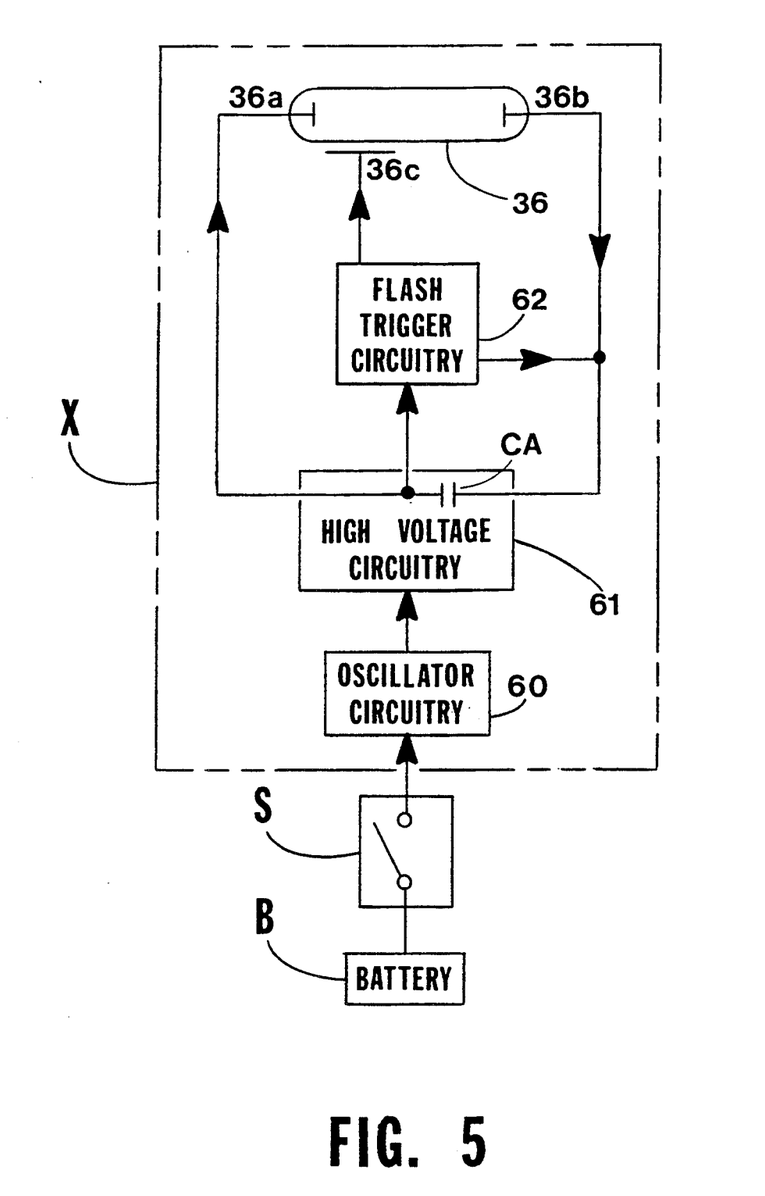
FIG. 5 is a schematic view illustrating a typical electrical circuit which may be employed in the device.

In FIG. 5, a typical xenon flash tube module X is shown in block form. Upon closure of switch S, a direct current is supplied by battery B to the oscillator circuitry 60 which converts the direct current into an alternating current. This alternating current is then fed to the high voltage circuitry 61 which produces a high voltage alternating current, then converts this current into a high voltage direct current. This high voltage direct current is then both stored in a capacitor CA, or multiple capacitors, and fed to the ionizing electrodes 36a and 36b of xenon flash tube 36, which is filled with the normally electrically nonconductive inert gas xenon. The flash trigger circuitry 62 is provided to ionize the xenon gas in the xenon flash tube 36, making this gas electrically conductive, so that it can repetitively discharge the high voltage direct current stored in the capacitor CA, producing a repetitive output of high intensity light energy flashes of extremely short duration. It is to be emphasized that the block diagram depicted in FIG. 5 is only meant to illustrate the operation of a basic xenon flash tube module, as there are many variations of such modules commercially available. One source of such modules, in which the circuitry is incorporated, is MPI of Winchester, Mass.

In FIG. 6, in a slightly modified form of the device wherein I have used the same numerals to identify the same parts, I have shown an exemplary light ray LR path to illustrate the manner in which the light rays (only four are shown as LR1–LR4) are concentrated to bounce in a zigzag path along the length of the receptacle tube 23. In FIG. 6, the surface 37 is arcuately divergent.

The tube depicted in the various Figures provides an accommodation for a wide variety of lures and attractors, while at the same time being of such an interior diameter, which only shallowly increases, that a maximum number of light ray bounces is achieved over the length of the tube to enable a rapid saturation of the photoluminous material on the attractors with as few as three flashes. As the outer diameter of the enclosure tube at the remote end of the tube is increased up to what is believed to be a maximum diameter of 12 inches for my purposes, the number of bounces achieved along the interior surface of the tube decreases. Because the light rays are permitted to spread, a greater number of flashes must be employed to achieve excitation when the diameter of the tube at its outer end is so increased.

THE OPERATION

Considering first the operation of the conventional switch unit S, it is to be appreciated that, when slide button 56 is moved forwardly from rest position to engage the end 54a with detent 55b, and the push button 50 is depressed sufficiently, the actuator flange 47b is depressed by button flange 50a and acts through flexible gasket 45 to cause the contact arm 46 to be brought down into engagement with conductor rivet 46a and thereby electrically bridge the contact strips 31 and 40. The contact arm 46 will spring back to the nonengaged position shown in FIG. 4 when button 50 is released, and spring actuator 53, which has been depressed by button 50, will at the same time restore the button 50 to the position shown in FIG. 4. If the button 50 is simply held down, multiple flashes can be achieved.

Alternatively, slide button 56 can be pushed fully forward and will carry spring actuator 52 forwardly with it to engage the end 53a with the end 47a and depress it to similarly provide a vertical pressure acting through gasket 45 on the free end of arm 46 and move it into engagement with the conductor rivet 46a. As long as the button 56 remains in the full forward position, where it is held by detent 55c, the unit will continue to flash. When the button 56 is slid fully rearward again, however, it will restore spring actuator part 53 to the inactive position shown in FIG. 4 and permit arms 46 and part 47a of the actuator 47 to return to the inoperative position shown in FIG. 4.

In the practice of the invention, and when switch S is activated to make the circuit to the flash module X, it is believed that saturation of the fish lures or other attractors, which are placed first of all within the enclosure 23 prior to activation of the switch S, can be achieved with only three flashes. The lure A can be placed within the enclosure 23 while still attached to the line. Because of the configuration of the tubular enclosure 23 and the repetitive high intensity reflected pulses of light which are achieved along the length of the highly reflective interior face of the enclosure 23, a light saturation is achieved which permits the fish attractor to glow at a bright intensity for a much longer period of time than previously. For example, when a fishing lure is excited with light from a standard flashlight, which takes up to ten minutes, only about ten minutes of glow is obtained. The exciting operation is somewhat improved when a camera flash unit is utilized but the light rays from such a unit spread in all directions and many repetitive flashes are needed to provide a more effective glow for what amounts to still a short duration of time. The considerable number of flashes which are required discharge the camera flashtube batteries more rapidly than is desired which means that, over time, the batteries used with the camera flash units will provide less power, and will need replacement far sooner than I feel to be desirable. The present device is designed to provide a high intensity glow for as much as an hour to an hour and a half of fishing without a need for reexcitation. The excitation time can consume less than five seconds.

Because the luminescent target ring 39 will, for practical purposes, mirror the lure which will be many feet under the water, i.e., perhaps one hundred feet or more, when salmon and lake trout are the game fish of choice, the fishermen will know when reexcitation of the lure is necessary by simply gaging the intensity of the glow remaining after a protracted period of use. The lure, which, of course, has one or more treble hooks and must be handled carefully, can be readily inserted through the visible band 39 in the dark without fumbling and perhaps hooking the hands or clothing of the fisherman who need not disengage the lure from the fishing line. Within a matter of seconds, the lure can be reexcited and quickly returned to the appropriate depth to resume fishing with what amounts to minimum interruption.

It is to be understood that the embodiments described are exemplary of various forms of the invention only and that the invention is defined in the appended claims which contemplate various modifications within the spirit and scope of the invention.

I claim:

1. A method of activating luminescent fishing line attached lures and other fish attractors which are light activatable with a flash element connected with a battery housed in a battery casing via a voltage building circuit to provide highly intensive light flashes, the casing having an attractor enclosing member with a first open end adjacent said flash element to receive the light from said flash element therein, and further having a remote open end, and the enclosing member having an interiorly facing substantially opaque, light reflective surface for concentrating light rays emitted from said flash element, comprising the steps of:
   (a) placing the lure or attractor in the enclosing member by inserting it through the remote open end;
   (b) repetitively powering said flash element and directing the light rays emitted successively into said enclosing member through said first open end;
   (c) repetitively bouncing the light rays from one reflective surface portion to another along said light reflective surface to impinge upon all luminescent surfaces of said lure or attractor to thereby cause them to store electromagnetic energy and emit light under low light conditions for a protracted period of time; and
   (d) removing the lure or attractor from the remote open end of said enclosing member.

2. The method of claim 1 wherein the interior facing surface of the enclosing member has a micron finish on the order of a range of 4 microns to 125 microns.

3. The method of claim 1 wherein said interior facing surface is provided by plating of a highly reflective metal on said enclosure member.

4. The method of claim 1 wherein said interior facing surface is machined to a high gloss.

5. The method of claim 1 wherein said enclosure member has a length of at least two inches.

6. The method of claim 1 wherein said enclosure member has a minimum interior diameter of one inch.

7. The method of claim 1 wherein said flash element has a candle power of at least 20,000.

8. The method of claim 1 wherein said flash element emits flashes at a rate within the range of 30 to 70 flashes per minute when power is applied continuously.

9. The method of claim 1 wherein said enclosure element has a length in the neighborhood of twelve inches.

10. The method of claim 1 comprising luminescently light activating the remote end of said enclosure member and guiding the attractor into aid remote end using said end as a visual target.

11. In an exciter for luminescent attractors, the combination of:
   (a) a battery casing;
   (b) a high energy flash lamp for said casing adapted to flash repeatedly at a cycled rate when powered by a battery in said casing so long as power is applied;
   (c) an enclosure member having one end adjacent said flash lamp to receive light rays therefrom and a remote open end permitting the insertion of an attractor having a luminescent surface; and
   (d) the enclosure member having an interiorly facing reflective surface for concentrating the light rays and repetitively bouncing the light rays from one reflective surface portion of said reflective surface to another along said reflective surface to impinge upon all luminescent surfaces of said attractor to thereby cause them to emit light in low light conditions for a protracted period of time.

12. The exciter of claim 11 wherein said interiorly facing surface forms the internal surface of said enclosure member.

13. The exciter of claim 11 wherein said enclosure comprises a translucent tubular member with a metal plated on its exterior such that the glossy surface of the plated metal faces internally.

14. The exciter of claim 11 wherein said flash element comprises a tube with a forwardly facing light directing surface behind it, the enclosure is a tubular element with a first diverging interior portion adjacent said flash lamp aligned to receive and direct the light energy emitted from said flash lamp and light directing surface, the tubular element having a more shallowly divergent second interior surface extending from said first interior position to said remote end.

15. The exciter of claim 14 wherein said second interior surface extends in the range from two to twelve inches and has a diameter of one to twelve inches.

16. The exciter of claim 14 wherein said first and second interior surfaces have light reflective gloss surfaces.

17. The exciter of claim 14 said first and second light reflective surfaces have a micron finish in the range of 4 to 125 microns.

18. The exciter of claim 11 wherein said enclosure element has an interior luminescent perimetral surface near its said remote end to function as a target for easy entry of the attractor in the dark.

19. The exciter of claim 18 wherein said perimetral surface is a target ring, and said flash element is a forwardly facing xenon tube, with a rear reflector plate, powered by a capacitive circuit.

20. In a method of making an exciter for luminescent attractors having a battery casing and a high energy flash lamp for said casing adapted to flash when powered by a battery in said casing so long as power is applied, the step of: attaching an enclosure tube member to said battery casing such that the tube member has one end adjacent said flash lamp to receive light rays therefrom and a remote open end permitting the insertion of an attractor having a luminescent surface, the enclosure member further having an interiorly facing reflective surface for concentrating the light rays and repetitively bouncing the light rays from one reflective surface portion of said reflective surface to another along said reflective surface to impinge upon all luminescent surfaces of said attractor to thereby cause them to emit light in low light conditions for a protracted period of time.

* * * * *